United States Patent
Kamaci et al.

(10) Patent No.: US 7,418,147 B2
(45) Date of Patent: Aug. 26, 2008

(54) CAUCHY-DISTRIBUTION BASED CODING SYSTEM AND METHOD

(75) Inventors: Nejat Kamaci, Marietta, GA (US); Yucel Altunbasak, Atlanta, GA (US); Russell Manning Mersereau, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 706 days.

(21) Appl. No.: 10/877,349

(22) Filed: Jun. 25, 2004

(65) Prior Publication Data

US 2005/0031034 A1 Feb. 10, 2005

Related U.S. Application Data

(60) Provisional application No. 60/482,392, filed on Jun. 25, 2003.

(51) Int. Cl.
*G06K 9/36* (2006.01)
*G06K 9/46* (2006.01)

(52) U.S. Cl. ...................................... 382/251
(58) Field of Classification Search ................ 382/232, 382/233, 246, 250, 251, 254, 276, 215; 370/312, 370/468; 358/3.05; 375/240.03, 240.12, 375/341
See application file for complete search history.

(56) References Cited

U.S. PATENT DOCUMENTS

| 4,947,447 | A | * | 8/1990 | Miyaoka et al. ............. 382/246 |
| 6,621,933 | B2 | | 9/2003 | Chung et al. ................ 382/233 |
| 7,013,244 | B2 | * | 3/2006 | Cherkassky ................. 702/189 |
| 7,057,773 | B2 | * | 6/2006 | Ilbery ........................ 358/3.05 |
| 2004/0066959 | A1 | * | 4/2004 | Piket et al. .................. 382/128 |
| 2005/0031034 | A1 | * | 2/2005 | Kamaci et al. ......... 375/240.03 |
| 2005/0180459 | A1 | * | 8/2005 | Watson ....................... 370/468 |

OTHER PUBLICATIONS

International Search Report.
Eggerton, J. et al., "A Visually Weighted Quantization Scheme for Image Bandwidth Compression at Low Data Rates" Communications, IEEE Transactions on (legacy, pre-1988), vol. 34, Issue: Aug. 8, 1986 pp. 840-847, especially pp. 842-845.
Adjeroh, D.A. et al. "On ratio-based color indexing" Image Processing, IEEE Transactions on, vol. 10, Issue: 1, Jan. 2001 pp. 36-48.
Sebe, N. et, al. "Emotion recognition using a Cauchy Naive Bayes classifier" Pattern Recognition, 2002. Proceedings. 16th International Conference on, vol. 1, Aug. 11-15, 2002 pp. 17-20 vol. 1.
Yucel Altunbasak and Nejat Kamaci, "An Analysis Of The DCT Coefficient Distribution With The H.264 Video Coder," Center for Signal and Image Processing, Georgia Institute of Technology, Atlanta, GA 30332.

(Continued)

*Primary Examiner*—Amir Alavi
(74) *Attorney, Agent, or Firm*—Thomas, Kayden, Horstemeyer & Risley

(57) ABSTRACT

Embodiments of a coding system and method are disclosed. One method embodiment includes determining a Cauchy-based probability density function fit to a statistical distribution of coefficients generated from a transformed image frame block that are to be quantized, and estimating rate and distortion of quantized coefficients based on the Cauchy-based probability density function.

31 Claims, 3 Drawing Sheets

OTHER PUBLICATIONS

T. Eude, R. Grisel, H. Cherifi and R. Debrie, "On The Distribution Of The DCT Coefficients," 0-7803-1775-0/94, 1994 IEEE, pp. V-365-V-368.

Hsueh-Ming Hang and Jiann-Jone Chen, "Source Model For Transform Video Coder And Its Application-Part 1: Fundamental Theory," IEEE Transactions On Circuits And Systems For Video Technology, vol. 7, No. 2, Apr. 1997, pp. 287-298.

Zhihai He, Yong Kwan Kim and Sanjit K. Mitra, "Low-Delay Rate Control For DCT Video Coding via $p$-Domain Source Modeling," IEEE Transactions On Circuits And Systems For Video Technology, vol. 11, No. 8, Aug. 2001, pp. 928-940.

Liang-Wei Lee, Jhing-Fa Wang, Jau-Yien Lee and Chuen Cherng Chen, "On The Error Distribution And Scene Change For The Bit Rate Control Of MPEG," IEEE Transactions On Consumer Electronics, vol. 39, No. 3, Aug. 1993, pp. 545-554.

Zhihai He and Sanjit K. Mitra, "A Unified Rate-Distortion Analysis Framework For Transform Coding," IEEE Transactions On Circuits And Systems For Video Technology, vol. 11, No. 12, Dec. 2001, pp. 1221-1236.

Bo Tao, Bradley W. Dickinson and Heidi A. Peterson, "Adaptive Model-Driven Bit Allocation For MPEG Video Coding," IEEE Transactions On Circuits And Systems For Video Technology, vol. 10, No. 1, Feb. 2000, pp. 147-157.

Wei Ding and Bede Liu, "Rate Control Of MPEG Video Coding And Recording By Rate-Quantization Modeling," IEEE Transactions On Circuits And Systems For Video Technology, vol. 6, No. 1, Feb. 1996, pp. 12-20.

Tihao Chiang and Ya-Qin Zhang, "A New Rate Control Scheme Using Quadratic Rate Distortion Model," IEEE Transactions On Circuits And Systems For Video Technology, vol. 7, No. 1, Feb. 1997, pp. 246-250.

Jordi Ribas-Corbera and Shawmin Lei, "Rate Control In DCT Video Coding For Low-Delay Communications," IEEE Transactions On Circuits And Systems For Video Technology, vol. 9, No. 1, Feb. 1999, pp. 172-185.

Stephen R. Smoot, Computer Science Division, University of California at Berkeley, Berkeley, CA 94720, "Study Of DCT Coefficient Distributions."

Markus Flierl and Bernd Girod, "Generalized B Pictures And The Draft H.264/AVC Video-Compression Standard," IEEE Transactions On Circuits And Systems For Video Technology, vol. 13, No. 7, Jul. 2003, pp. 587-597.

Henrique S. Malvar, Antti Hallapuro, Marta Karczewicz and Louis Kerofsky, "Low-Complexity Transform And Quantization In H.264/AVC," IEEE Transactions On Circuits And Systems For Video Technology, vol. 13, No. 7, Jul. 2003, pp. 598-603.

Detlev Marpe, Heiko Schwarz and Thomas Wiegand, "Context-Based Adaptive Binary Arithmetic Coding In The H.264/AVC Video Compression Standard," IEEE Transactions On Circuits And Systems For Video Technology, vol. 13, No. 7, Jul. 2003, pp. 620-636.

Jordi Ribas-Corbera, Philip A. Chou and Shankar L. Regunathan, "A Generalized Hypothetical Reference Decoder For H.264/AVC," IEEE Transactions On Circuits And Systems For Video Technology, vol. 13, No. 7, Jul. 2003, pp. 674-687.

Thomas Wiegand, Heiko Schwarz, Anthony Joch, Faouzi Kossentini and Gary J. Sullivan, "Rate-Constrained Coder Control And Comparison Of Video Coding Standards," IEEE Transactions On Circuits And Systems For Video Technology, vol. 13, No. 7, Jul. 2003, pp. 688-703.

Thomas Wiegand, Gary J. Sullivan, Gisle Bjontegaard and Ajay Luthra, "Overview Of The H.264/AVC Video Coding Standard," IEEE Transactions On Circuits And Systems For Video Technology, vol. 13, No. 7, Jul. 2003, pp. 560-576.

Mathias Wien, "Variable Block-Size Transforms For H.264/AVC," IEEE Transactions On Circuits And Systems For Video Technology, vol. 13, No. 7, Jul. 2003, pp. 604-839.

Huifang Sun, Wilson Kwok, Max Chien and C.H. John Ju, "MPEG Coding Performance Improvement By Jointly Optimizing Coding Mode Decisions And Rate Control," IEEE Transactions On Circuits And Systems For Video Technology, vol. 7, No. 3, Jun. 1997, pp. 449-458.

Zhengguo Li, Wen Gao, Feng Pan, Siwei Ma, Keng Pang Lim, Genan Feng, Xiao Lin, Susanto Rahardja, Hanqin Lu and Yan Lu, "Adaptive Rate Control With HRD Consideration," Joint Video Team (JVT) of Iso/IEC MPEG & ITU-T VCEG (ISO/IEC JTCI/SC29/WG11 and ITU-T SG16 Q.6), 8$^{th}$ Meeting: Geneva, May 20-26, 2003, Document JVT-H014, Filename: JVT-H014.doc., pp. 1-19.

Liang-Jin Lin and Antonio Ortega, "Bit-Rate Control Using Piecewise Approximated Rate-Distortion Characteristics," IEEE Transactions On Circuits And Systems For Video Technology, vol. 8, No. 4, Aug. 1998, pp. 446-459.

Liang-Jin Lin, Antonio Ortega and C.-C. Jay Kuo, "Rate Control Using Spline-Interpolated R-D Characteristics," Signal and Image Processing Institute and Department of Electrical Engineering-Systems, University of Southern California, Los Angeles, California 90089-2564.

Yong Kwan Kim, Zhihai He and Sanjit K. Mitra, "A Novel Linear Source Model And A Unified Rate Control Algorithm For H.263/MPEG-2/MPEG-4," 0-7803-7041/01, 2001 IEEE, pp. 1777-1780.

Siwei Ma, Wen Gao, Peng Gao and Yan Lu, "Rate Control For Advance Video Coding (AVC) Standard," O-7803-7761-3/03, 2003 IEEE, pp. II-892-II-895.

Edmund Y. Lam and Joseph W. Goodman, "A Mathematical Analysis Of The DCT Coefficient Distributions For Images," IEEE Transactions On Circuits And Systems For Video Technology, vol. 9, No. 10, Oct. 2000, pp. 1661-1666.

F. Muller, "Distribution Shape Of Two-Dimensional DCT Coefficients Of Natural Images," Electronics Letters, 28$^{th}$ Oct. 1993, vol. 29, No. 22, pp. 1935-1936.

Bo Tao, Heidi A. Peterson and Bradley W. Dickinson, "A Rate-Quantization Model For MPEG Encoders," 0-8186-8183-7/97, 1997 IEEE, pp. 338-341.

Kyeong Ho Yang, Arnaud Jacquin and Nikil S. Jayant, "A Normalized Rate-Distortion Model For H.263-Comopatible Codecs And Its Application To Quantizer Selection," 0-8186-8183-7/97, 1997 IEEE, pp. 41-44.

Y.-S. Saw, P.M. Grant, FIEE, J.M. Hannah, "Rate-Distortion Analysis Of Nonlinear Quantisers For MPEG Video Codes: Sigmoidal And Unimodal Quantiser Control Functions," IEE Proc.-Vis. Image Signal Process., vol. 145, No. 4, Aug. 1998, pp. 249-256.

Siwei Ma, Wen Gao, Feng Wu and Yan Lu, "Rate Control For JVT Video Coding Scheme With HRD Considerations," 0-7803-7750-8/03, 2003 IEEE, pp. III-793-III-796.

Herbert Gish and John N. Pierce, "Asymptotically Efficient Quantizing," IEEE Transactions On Information Theory, vol. IT-14, No. 5, Sep. 1968, pp. 676-683.

M. Barni, F. Barolini, A. Piva and F. Rigacci, "Statistical Modelling Of Full Frame DCT Coefficients," Dipartmento di Ingegneria Elettronica, Universita di Firenze, Via Stanta Marta 3, 50139 Firenze, Italy.

* cited by examiner

CAUCHY-DISTRIBUTION BASED CODING SYSTEM AND METHOD

CROSS-REFERENCE TO RELATED APPLICATION

This application claims the benefit of U.S. Provisional Application No. 60/482,392, filed Jun. 25, 2003, which is entirely incorporated herein by reference.

STATEMENT REGARDING FEDERALLY SPONSORED RESEARCH OR DEVELOPMENT

This invention was made with government support under grant No. CCR-0131855 awarded by the National Science Foundation. The government has ceratin rights in the invention.

TECHNICAL FIELD

The present disclosure is generally related to signal processing systems, and, more particularly, is related to transform-based video compression systems and methods for processing images and video sequences.

BACKGROUND

Over the past few decades, transform-based compression technology for image and video sources has gained widespread popularity for visual information management, processing, and communications. As a result, several industry standards have been developed, such as JPEG for still image coding, and MPEG and H.26× for video coding. In general, image and video processing methods compliant with these standards are implemented by dividing an image frame(s) into nonoverlapping blocks, and applying a transformation to each block before applying both quantization and entropy coding. A two-dimensional discrete cosine transform (DCT) is the most common transform used in these methods.

The probability distribution of DCT coefficients is often used in the design and optimization of a quantizer, entropy coder, and related video processing algorithms for use in various signal/image processing equipment (e.g., encoders, decoders, etc.). Determining the probability distribution of DCT coefficients is particularly helpful in rate control for video coding, since the design of a rate control algorithm, and in particular, optimal bit allocation and quantization scale selection, can require knowledge of a rate-distortion relation as a function of the encoder parameters and the video source statistics. The rate-distortion relation can be derived mathematically using the probability distribution of the DCT coefficients. Various distribution models for the AC coefficients have been proposed, including Gaussian distributions and Laplacian distributions.

FIG. 1 shows a schematic diagram of a typical plot of a histogram of discrete cosine transform (DCT) coefficients for an 8×8 block-based DCT of an image, for which the DC coefficients are excluded. The image used here is from a frame of a commonly used anchor video sequence, the AKIYO sequence in QCIF format. The DCT coefficient distribution is most commonly approximated by a Laplacian probability density function (pdf) with parameter $\lambda$:

$$p(x) = \frac{\lambda}{2}\exp\{-\lambda|x|\}, x \in R \qquad \text{Eq. 1}$$

The Laplacian density has an exponential form, leading to the property that the tails of the density decay very quickly.

One problem often encountered in coder design using conventional probability density functions is that the actual distributions of the DCT coefficients in image and video applications can differ significantly from the Gaussian distributions and Laplacian distributions commonly assumed. As a result, rate and distortion models based on either of these distributions may fail to estimate the actual rate-distortion-coding parameter relations accurately and reduce the effectiveness of the coder.

SUMMARY

Embodiments of the present invention provide a Cauchy-distribution based coding system and method. Briefly described, in architecture, one embodiment of the system, among others, can be implemented as transform logic configured to transform an image frame block to coefficients that are to be quantized; and coding control logic configured to determine a Cauchy-based probability density function fit to a statistical distribution of the coefficients, said coding control logic configured to estimate rate and distortion of quantized coefficients based on the Cauchy-based probability density function.

Embodiments of the present invention can also be viewed as providing methods for rate-distortion optimization for image and video processing. In this regard, one embodiment of such a method, among others, can be broadly summarized by the following steps: determining a Cauchy-based probability density function fit to a statistical distribution of coefficients generated from a transformed image frame block that are to be quantized; and estimating rate and distortion of quantized coefficients based on the Cauchy-based probability density function.

Other systems, methods, features, and advantages of the disclosure will be or become apparent to one with skill in the art upon examination of the following drawings and detailed description.

BRIEF DESCRIPTION OF THE DRAWINGS

Many aspects of a Cauchy-distribution based coding system and method can be better understood with reference to the following drawings. The components in the drawings are not necessarily to scale, emphasis instead being placed upon clearly illustrating the disclosed principles. Moreover, in the drawings, like reference numerals designate corresponding parts throughout the several views.

DETAILED DESCRIPTION OF THE PREFERRED EMBODIMENTS

Figure 1:
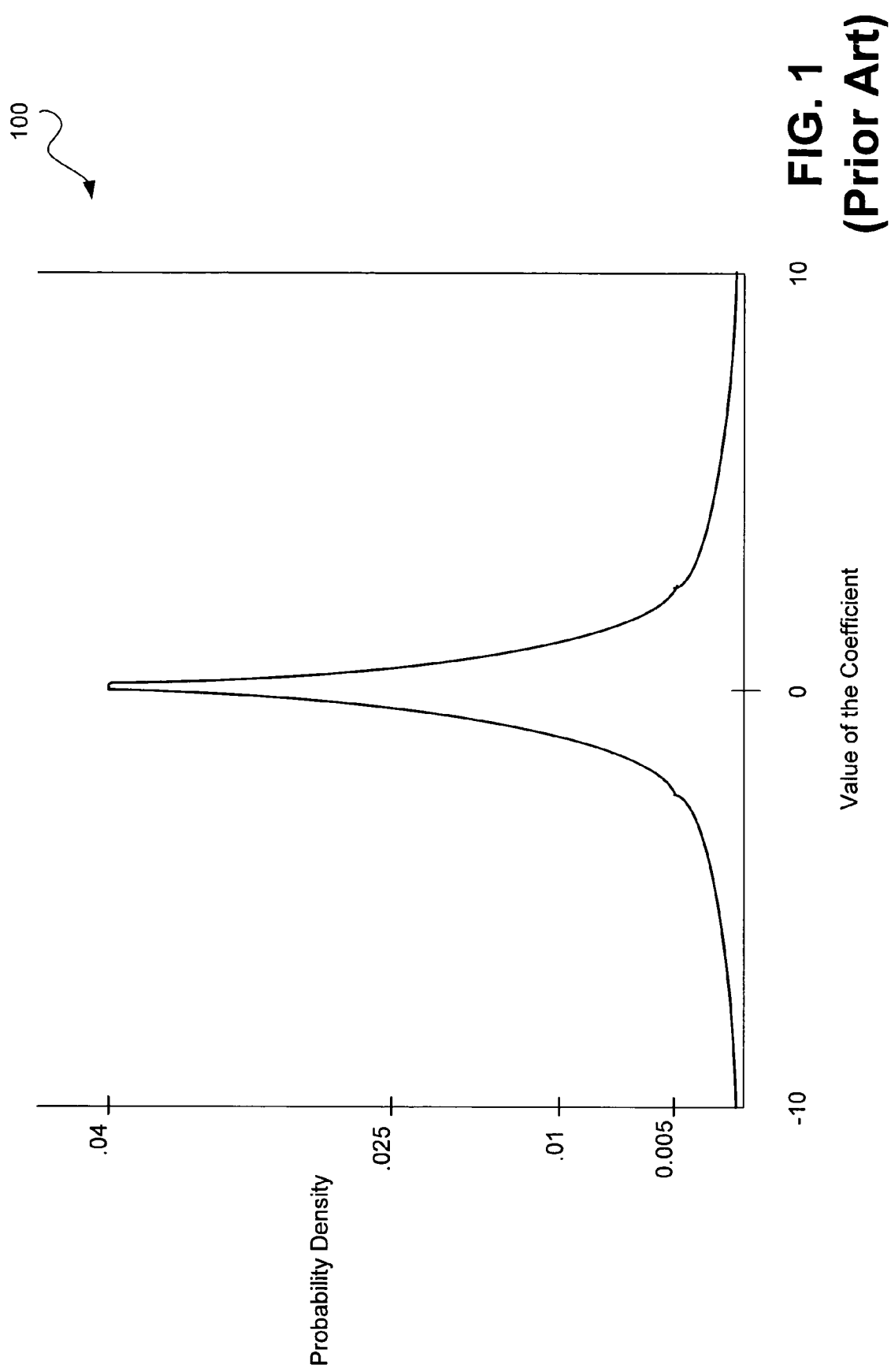
FIG. 1 is a schematic diagram of a typical plot of a histogram of discrete cosine transform (DCT) coefficients for an 8×8 block-based DCT of an image, for which the DC coefficients are excluded.

Preferred embodiments of a Cauchy-distribution based coding system and method are disclosed, herein simply referred to as a coding system. A zero-mean, Cauchy distribution with parameter μ, has a probability density function described as follows:

$$p(x) = \frac{1}{\pi} \frac{\mu}{\mu^2 + x^2}, x \in R,$$  Eq. 2

Experiments have shown that in most cases, a Cauchy-based distribution for discrete cosine transform (DCT) coefficients in inter- and intra-coding implementations is a better fit to received video or image signals than Laplacian or Gaussian density functions. The parameter μ depends on the picture content. Cauchy-distribution is characterized by a smooth distribution around the origin (0) when compared to other distributions, such as the Laplacian distribution. That is, the Laplacian distribution is more impulse-like at the origin and falls very fast at the origin. The Cauchy-distribution at the tails (far away points from the origin) falls less rapidly than the Laplacian. That is, it has heavier tails compared to the Laplacian. Note that the use of the Cauchy-based will herein be understood to include statistical distributions similar to Cauchy, or that exhibit Cauchy-distribution-like behavior, including mixtures of Cauchy distributions with other statistical distributions or Cauchy distributions with different parameters. Finally, it will be understood that the disclosed rate and distortion models and their applications in video coding algorithms such as rate control, macroblock mode selection, and motion estimation can be used together with rho-domain models, the rho-domain models described in the following publications, all three publications herein entirely incorporated by reference: (1) Z. He and S. K. Mitra, "A unified rate-distortion analysis framework for transform coding, "IEEE Transactions on Circuit and Systems for Video Technology, vol. 11, no. 12, pp. 1221-1236, December 2001; (2) Z. He, Y. Kim, and S. K. Mitra, "A novel linear source model and a unified rate control algorithm for H.263/MPEG-2/MPEG-4," Proc. Int. Conf. Acoustics, Speech, and Signal Processing, Salt Lake City, Utah, May 2001; and (3) Z. He, Y. K. Kim, and S. K. Mitra "Low delay rate control for DCT video coding via ½-domain source modeling," IEEE Transactions on Circuits and Systems for Video Technology, vol. 11, no. 8, August 2001. A vigorous proof of the differences between Laplacian probability density functions and Cauchy probability density functions is described in the provisional application referenced in the Cross-Reference to Related Application section. A coding system will be described in the context of the video coding layer (H.264 is designed in two layers: a video coding layer and a network adaptation layer) of an H.264 (equivalently MPEG-4 Part 10) compliant encoder that uses Cauchy probability density function based rate-distortion models to achieve rate-distortion optimization. However, it will be understood that the principles of operation can be applied to coding functions in addition to rate control, such as mode decision and motion estimation. Further, it will be understood that the scope of the preferred embodiments extends to other types of encoders, known or developed in the future.

Figure 2:
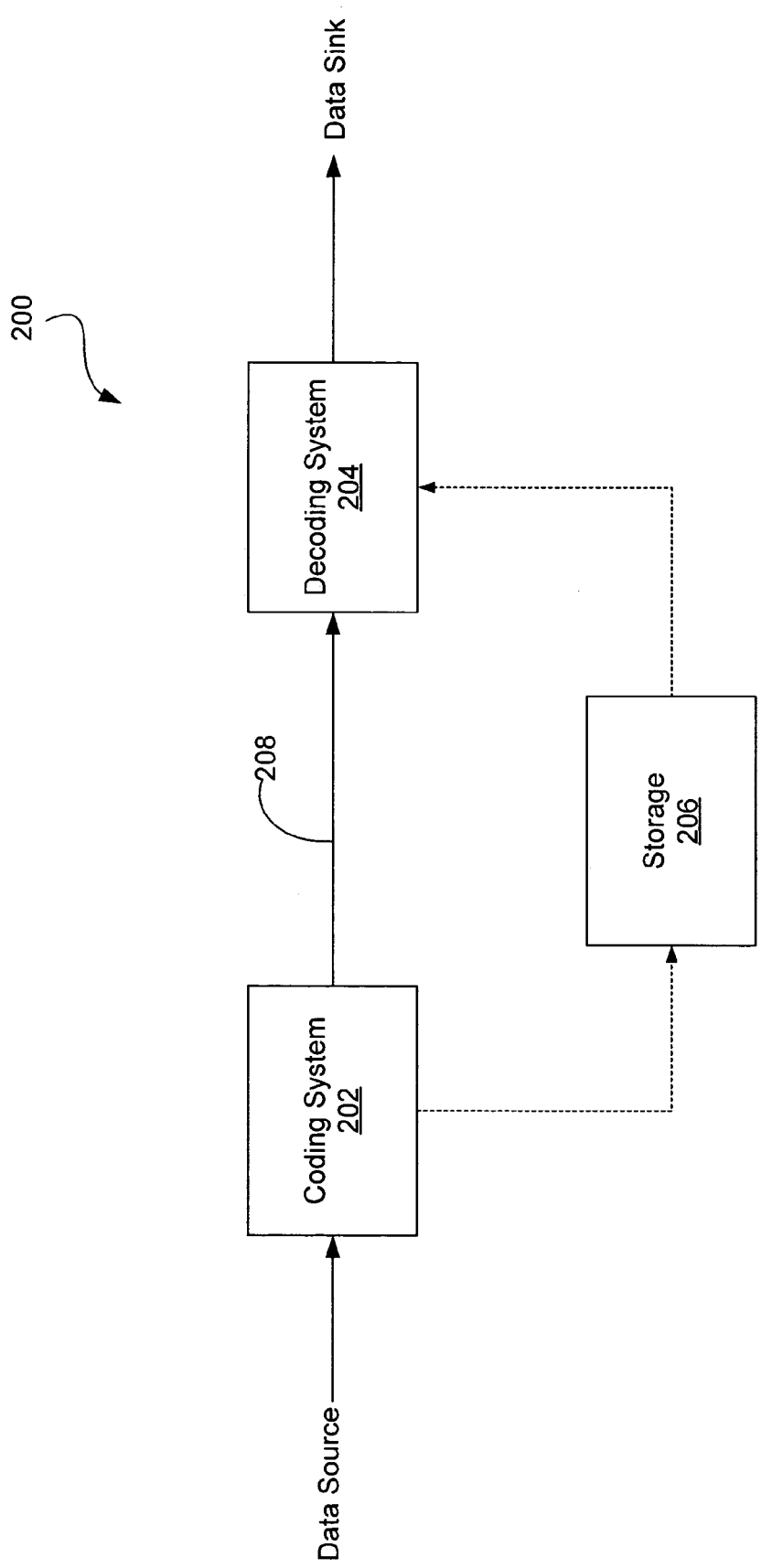
FIG. 2 is a block diagram that illustrates an example implementation for a Cauchy-distribution based coding system and method.
Figure 3:
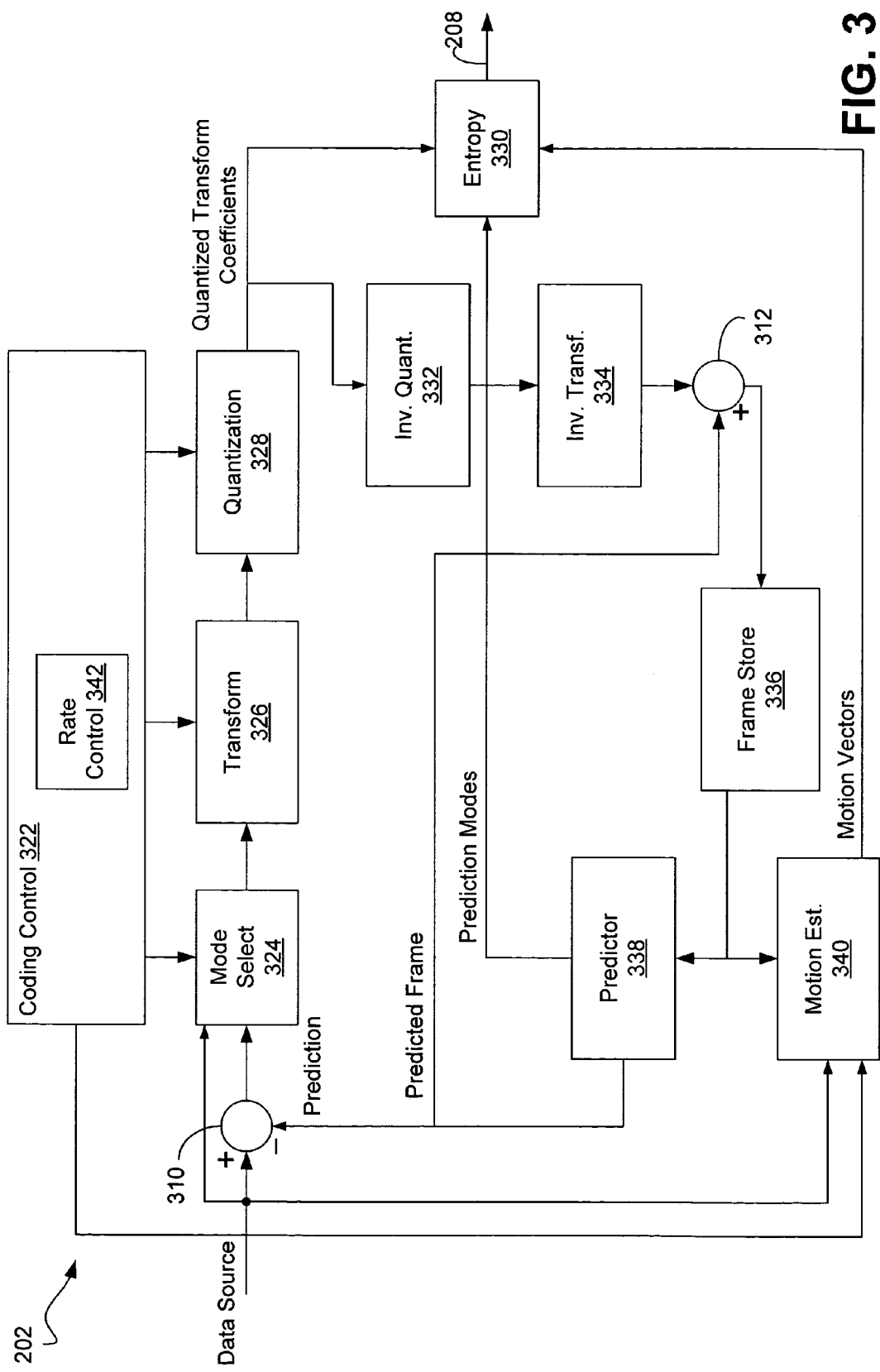
FIG. 3 is a block diagram of an embodiment of the coding system shown in FIG. 2.

FIG. 2 is used to provide an example implementation for a coding system. FIG. 3 will illustrate an embodiment of the coding system shown in FIG. 2. Further, a student t-distribution with one degree of freedom, or equivalently the centralized Cauchy density, is described below which can be a better choice than the Laplacian density for estimating the actual probability density function (pdf) of DCT coefficients. Cauchy probability density function-based models are presented that describe the relations between the quantization parameter Q of a coding system and the output bit-rate and the distortion caused by quantization. Also, the results of an experimental comparison between Laplacian- and Cauchy-based rate-distortion models are presented, which show that the change of the rate and the distortion as a function of the quantization parameter Q can be estimated more accurately using the Cauchy-distribution based models. Finally, the Cauchy-based models are used to illustrate a solution to a frame bit-allocation problem for rate control.

FIG. 2 is a block diagram that illustrates an example network 200 for implementing a Cauchy-distribution based coding system and method. As shown, the network comprises a coding system 202, a decoding system 204, and an optional storage system 206. The coding system 202 receives video data or image data from a data source, including visual information from a camera or video feed. Visual information can include conversational video where the temporal information variation is small, action movies where both the spatial and temporal variations can be large, and any continuum in between. Video sources can thus be classified according to the amount of spatial and temporal information they carry. In general, based on its spatial variation, a video source can fall into one of two categories: (i) smooth and (ii) textured. Based on its temporal variation, a video source can also be generally classified into two categories: (i) slow motion and (ii) varying content.

After processing the received data in a manner described below, the coding system 202 provides the processed data over a transmission channel 208 to the decoding system 204, which decodes the processed data for use at a data sink, such as at a consumer electronics device. The transmission channel 208 may be a medium suitable for propagating the data from the coding system 202 to a remotely located decoding system 204. A suitable medium includes free space (e.g., via satellite) or conductive media such as hybrid-fiber coax (HFC, for example in a cable network) cable. In some implementations, the coding system 202 and the decoding system 204 may transfer data using a storage device 206 as an intermediate location. For example, the storage device 206 can be RAM and/or persistent storage such as a CD or like medium. The transmission channel 208 also includes a medium for transferring data internally to an electronics device, such as a bus or other conductive paths as used in a consumer electronics device.

Preferred embodiments of the coding system 202 can be implemented in hardware, software, firmware, or a combination thereof. In one embodiment, the coding system 202 can be implemented in hardware, implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

If one or more of the functionalities of the coding system 202 is implemented as software, as in one embodiment, such functionalities of the coding system 202 can be software or firmware that is stored in a memory and that is executed by a suitable instruction execution system. The coding system software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the preferred embodiments includes embodying the coding system functionality in logic embodied in hardware or software-configured mediums.

Similarly, the decoding system 204 can be embodied in an ASIC decoder integrated in an electronic device, remote from or integrated with the coding system 202. In some embodiments, the decoding system 204 can be implemented using hardware, software, or a combination of both.

FIG. 3 is a block diagram of an embodiment of the coding system 202 shown in FIG. 2. As indicated above, the coding system 202 can be embodied as an H.264-compliant encoder. In general, an H.264-compliant encoder uses translational block-based motion compensation and transform based residual coding, and may feature scalar quantization with an adjustable quantization step size for output bit-rate control, zigzag scanning and run-length VLC coding of the quantized transform coefficients. An H.264-compliant encoder may use multiple reference pictures and different block sizes for supporting motion compensation. An H.264-compliant encoder may also use an integer 4-by-4 transform that reduces blocking and ringing artifacts, and which may also eliminate encoder-decoder mismatches in the inverse transform. This integer transform is a very close approximation to the discrete cosine transform. An H.264-compliant encoder also supports spatial prediction within the frames that helps to reduce the residual energy of motion compensation. Finally, an H.264-compliant encoder uses complex and efficient context-adaptive binary arithmetic coding (CABAC) for entropy coding of the quantized transform coefficients.

In common with the earlier standards, the H.264 video coding standard does not explicitly define an encoder/decoder pair. The standard defines the decoding process, but many functional parts of the encoder are left open for optimization. One of these functional parts is the rate control module 342 that is responsible for controlling the output bit-rate of the coding system 202 as described below.

The coding system 202 includes function modules 310 and 312, and a coding control module 322 that includes a rate control module 342. The coding system 202 further includes a mode selection module 324, transform module 326, quantization module 328, entropy coding module 330, inverse quantization module 332, inverse transform module 334, predictor module 338, motion estimation module 340, and frame store module 336. The coding system 202 is implemented, in one embodiment, using block-based discrete cosine transforms (DCTs) for compression.

The performance of a video coder in terms of its output bit-rate, and the encoded video quality, varies with the nature of the data source (e.g., video source). Most video coding applications dictate certain conditions on the encoded video sequence, such as a desired quality or a constraint on the output bit-rate. In operation, video and/or image data from a data source is provided to the function module 310 and the mode selection module 324 as a sequence of ordered image frames. At the function module 310, the received data is combined with a set of predictions in a negative feedback loop from the predictor module 338. The predictor module 338 computes the set of predictions for each possible coding mode in either/both of the two ways: either/both a motion compensated prediction using previous video frames, or/and an intra prediction using the previously processed part of the recent data. The received data and its predictions result in a set of prediction residuals and side information (motion vectors or intra prediction modes). The resultant data is provided to the mode selection module 324. The mode selection module 324 selects which coding mode is to be used, including the set of prediction residuals and the original data itself. The DCT is applied to the image itself or to the residual image. In both cases, knowledge of DCT coefficient distribution is valuable for optimizing the coding system 202. Such information is important, for instance, in designing the quantization module 328 and the inverse quantization module 332.

Under control of the coding control module 322, the mode selection module 324 switches between the intra-frame data and the inter-frame (non-intra frame) data. The inter-frame data may include intra-frame data as well. Macroblocks are each provided to transform module 326, and under the control of coding control module 322, each macroblock undergoes, in one embodiment, a discrete cosine transform (DCT)-like (e.g., integer transform described above) transform. The transformed data is provided to quantization module 328, which under the control of the rate control module 342 of the coding control module 322, quantizes the transform coefficients. The quantized transform coefficients are provided to an entropy coding module 330 and an inverse quantizing module 332. At the inverse quantizing module 332, the quantized transform coefficients are inverse quantized and provided to the inverse transform module 334. At the inverse transform module 334, the data is inverse transformed and provided to function module 312. At the function module 312, the inverse transformed data is combined with a predicted frame provided by the predictor module 338, and the combined data is provided to a frame store 336. From the frame store 336, the data is provided to both the predictor module 338 and a motion estimator module 340 to undergo prediction and estimation, respectively. From the predictor module 338, the predicted data is provided to function module 310 as described above. From the motion estimation module 340, motion vectors are generated and provided to the entropy coding module 330. If intra prediction is supported by the coding system 202, from predictor module 338, the intra prediction modes are provided to the entropy coding module 330. At the entropy coding module 330, the motion vectors and intra prediction modes are combined with the quantized transform coefficients and output on transmission channel 208 as a compressed data stream.

The output bit-rate and video quality of the coding system 202 depends on several coding parameters, such as the quantization scale (Q) and the coding mode. In particular, selecting a large quantization scale reduces the resulting bit-rate, while at the same time reducing the visual quality of the encoded video. In most applications, a pre-determined constant output bit-rate is desired. These applications are referred to as constant bit-rate (CBR) applications. In some embodiments, variable bit-rate is also achievable in that the coding system 202 provides a rate-distortion function that can be used to optimize an average rate for a defined average quality. Through careful selection of the quantization parameters for each coding block, the output bit-rate of the coding system 202 can be controlled. The rate control module 342 selects the quantization parameters (e.g., quantization scale (Q)) for each coding block, and inputs this selection to the quantization module 328. Some of the tasks of the rate control module 342 may be complicated by the fact that the encoded video quality is preferably maintained at an optimum quality level for each picture frame and within each frame, avoiding such visual artifacts as blurring, blocking, and jitter. Thus, one goal of the rate control module 342 might be to keep the output bit-rate within defined limits while achieving uniform video quality. Another goal might be to keep the quality within defined limits to minimize the rate.

An optimal solution to the above-described rate control problem takes into consideration knowledge of the video source properties and the operation of the coding system as measured by the rate-distortion function. Thus, with knowledge of the rate-distortion characteristics of each coding block as a function of its properties and the coding parameters, an optimal solution to the rate control problem can be solved. Since the true rate-distortion function is not known, one solution involves using mathematical models that estimate the rate and quality (e.g., distortion) of the output of the coding system 202 as a function of the encoding parameters.

The entropy as a function of the quantization parameter Q for Cauchy distributions can be derived as follows. For simplicity, assume that the DCT coefficients are uniformly quantized with a quantization level Q, although similar formulas can be derived for non-uniform quantizers. Let P(iQ) be the probability that a coefficient is quantized to iQ, where $\{i=0, \pm1, \pm2, \ldots\}$. Then the entropy of the quantized DCT coefficients is computed as $$H(Q) = -\sum_{i=-\infty}^{\infty} P(iQ)\log_2[P(iQ)], \quad \text{Eq. 3}$$

where $$P(iQ) = \int_{(i-\frac{1}{2})Q}^{(i+\frac{1}{2})Q} f_X(x)\,dx \quad \text{Eq. 4}$$

For a Cauchy distribution, $$P(iQ) = \quad \text{Eq. 5}$$

$$\begin{cases} \int_{(i-\frac{1}{2})Q}^{(i+\frac{1}{2})Q} \frac{\mu}{\pi(\mu^2+x^2)}\,dx = \frac{1}{\pi}\tan^{-1}\left(\frac{\mu Q}{\mu^2+(i^2-1/4)Q^2}\right) & \text{if } i \neq 0 \\ \int_0^{Q/2} \frac{2\mu}{\pi(\mu^2+x^2)}\,dx = \frac{2}{\pi}\tan^{-1}\left(\frac{Q}{2\mu}\right) & \text{if } i = 0 \end{cases}$$

Therefore, the entropy function as a function of Q for a Cauchy distribution is $$H(Q) = -\frac{2}{\pi}\tan^{-1}\left(\frac{Q}{2\mu}\right)\log_2\left[\frac{2}{\pi}\tan^{-1}\left(\frac{Q}{2\mu}\right)\right] - \quad \text{Eq. 6}$$

$$\frac{2}{\pi}\sum_{i=1}^{\infty} \tan^{-1}\left(\frac{\mu Q}{\mu^2+(i^2-1/4)Q^2}\right)\log\left[\tan^{-1}\left(\frac{\mu Q}{\mu^2+(i^2-1/4)Q^2}\right)\right]$$

The entropy functions based on Cauchy probability density functions are computable, provided that the density parameters γ and μ are known. The Cauchy parameter μ can be estimated using a histogram of AC coefficients, according to the following procedure.

Suppose $\hat{F}_X(X)$ is the empirical cumulative density function (CDF) obtained from a DCT histogram. Assume that this is the CDF of a Cauchy source with parameter μ denoted as $F_X(x)$ and given as $$F_X(x) = \int_{-\infty}^{x} f_X(\tau)\,d\tau = \frac{1}{\pi}\tan^{-1}\left(\frac{x}{\mu}\right) + \frac{1}{2} \quad \text{Eq. 7}$$

Let $$F_X(|x|) = Pr(X \leq |x|) = \int_{-x}^{x} f_X(\tau)\,d\tau = \frac{2}{\pi}\tan^{-1}\left(\frac{x}{\mu}\right) \quad \text{Eq. 8}$$

Then μ can be calculated as $$\mu = \frac{a}{\tan(\pi F_X(|x|))}, \quad \text{Eq. 9}$$

for some threshold x. A proper selection of x would be to set it equal to μ. While μ is not known, its range has been found experimentally to generally lie in the interval [0, 3]. Thus, in experiments or simulations, x=2 was assumed. Therefore, to calculate μ, a fraction of the DCT coefficients with absolute value less than a pre-selected threshold value (e.g., x=2) is calculated and μ is solved using Eq. 9.

To show the effectiveness of the rate model (or entropy model) given in Eq. 6, several experiments were conducted with a number of video sequences, including encoding an intra frame followed by a non-intra frame for each sequence at several quantization levels to obtain the actual rate as a function of the quantization level Q for both intra and non-intra coding. An H.264-compliant encoder was configured to use context-adaptive binary arithmetic coding (CABAC) for entropy coding with the rate-distortion optimal mode selection activated. Rate estimates using Cauchy- and Laplacian-based entropy (rate) functions were calculated and compared with the actual rates. Well-known and publicly available H.264 reference software version JM-7.4 was used for the experiments.

Table I shows the rate (entropy) estimation accuracy based on both distributions with several frames selected from a wide range of well-known MPEG-4 video test sequences. In the table, the rate estimation error is calculated as $$\text{Error} = \frac{|\text{target rate} - \text{actual rate}|}{\text{target rate}} \qquad \text{Eq. 10}$$

TABLE I

| | Rate Estimation Error | | | |
|---|---|---|---|---|
| | Intra-coding | | Non-intra coding | |
| Image | Laplacian | Cauchy | Laplacian | Cauchy |
| CARPHONE | 0.1399 | 0.0231 | 0.3597 | 0.1152 |
| CLAIRE | 0.1247 | 0.0147 | 0.2831 | 0.0536 |
| FOREMAN | 0.1304 | 0.0168 | 0.4104 | 0.2866 |
| MOBILE & CALENDAR | 0.0618 | 0.0469 | 0.2820 | 0.1063 |
| IRENE | 0.1367 | 0.0219 | 0.4047 | 0.1881 |
| COAST GUARD | 0.1022 | 0.0547 | 0.2031 | 0.1156 |
| NEWS | 0.0800 | 0.0364 | 0.1325 | 0.0781 |
| TEMPETE | 0.0781 | 0.0547 | 0.2137 | 0.1156 |
| PARIS | 0.1329 | 0.0364 | 0.3567 | 0.1211 |

Clearly, the Cauchy-based rate estimate is significantly better than the Laplacian-based rate estimate. Experiments have shown that the Cauchy-based estimate of the rate is much closer to the actual rate achieved by the encoder than the Laplacian-based encoder, especially for intra coding.

Although the entropy of a quantized Cauchy source can be computed using Eq. 7, a simpler formula can be used. If the entropy function given in Eq. 6 is plotted for different values of $\mu$, a nearly linear behavior on a log scale can be obtained (not shown), especially for smaller $\mu$ values and for $Q>2$. Therefore, the entropy function of the quantized Cauchy source given in Eq. 6 can be approximated as follows:

$$H(Q) \approx aQ^{-\alpha}, \qquad \text{Eq. 11}$$

where $a, \alpha > 0$ are parameters that depend on $\mu$. These parameters can be calculated using Eq. 6 as follows: first, evaluate Eq. 6 for a given $\mu$ at N quantization levels, resulting in a set of N equations and two unknowns. Then, a and $\alpha$ can be solved as a least square error solution. Table II shows values of a and $\alpha$ for a possible set of $\mu$ values.

TABLE II

| $\mu$ | a (per pixel) | $\alpha$ |
|---|---|---|
| 0.2 | 1.86 | 0.87 |
| 0.5 | 3.68 | 0.84 |
| 1.0 | 5.91 | 0.81 |
| 1.5 | 7.48 | 0.78 |
| 2.0 | 8.59 | 0.75 |
| 3.0 | 9.93 | 0.70 |

The approximation is accurate, especially for $\mu \leq 2$.

The distortion due to quantization can also be estimated accurately for the Cauchy probability density function assumption. Assume a uniform quantizer with step size Q. The distortion caused by quantization is given by $$D(Q) = \sum_{i=-\infty}^{\infty} \int_{(i-\frac{1}{2})Q}^{(i+\frac{1}{2})Q} |x - iQ|^2 f_x(x) dx \qquad \text{Eq. 12}$$

It can be shown that this infinite sum converges and is bounded from above by $$\frac{Q^2}{4}.$$

For a Cauchy source, this expression becomes:

Eq. 13

$$D(Q) = 2 \sum_{i=1}^{M} \left[ \frac{\mu Q}{\pi} - \frac{i\mu Q}{\pi} \ln\left( \frac{\mu^2 + \left(i+\frac{1}{2}\right)^2 Q^2}{\mu^2 + \left(i-\frac{1}{2}\right)^2 Q^2} \right) - \frac{\mu^2 - i^2 Q^2}{\pi} \tan^{-1}\left( \frac{\mu Q}{\mu^2 + \left(i^2 - \frac{1}{4}\right)Q^2} \right) \right] + \left[ \frac{\mu Q}{\pi} - \frac{2\mu^2}{\pi} \tan^{-1}\left( \frac{Q}{2\mu} \right) \right]$$

Equation 13 suggests that the distortion depends on $\mu$ in addition to Q. Although this equation is complicated, it can be approximated accurately. A similar analysis as was performed in the above-described entropy simplification leads to the approximation:

$$D(Q) \approx bQ^{\beta} \qquad \text{Eq. 14}$$

where $b, \beta > 0$ are parameters that depend on $\mu$.

The approximate rate and distortion equations of Eq. 11 and Eq. 14 lead to the rate-distortion function, $$D = cR^{-\gamma} \qquad \text{Eq. 15}$$

with proper selection of the values c and $\gamma$.

The rate-distortion function of Eq. 15 can be applied to the problem of bit allocation for the coding system 202 to justify the effectiveness and practicality of the rate-distortion function. Three subproblems are considered: (i) groups of pictures (GOP) bit allocation, (ii) picture bit allocation, and (iii) macroblock Q selection. GOP bit allocation involves selecting the number of bits to allocate to a GOP, which in the case of CBR rate control, simply amounts to assigning a fixed number of bits per GOP. Picture bit allocation involves distributing the GOP "budget" among the picture frames, so as to achieve a maximal, uniform video quality. Although it does not fully represent the visual quality, the Peak SNR (PSNR) is most commonly used to quantify the video quality. Macroblock Q selection involves tuning the Q parameter for each macroblock of a frame so that the rate regulations are met and a uniform quality is achieved within the picture. Q selection may also affect motion estimation and compensation operations (the motion estimation module 340 uses a rate-distortion optimized algorithm for motion estimation, which involves Q).

The rate control module 342 distributes a given GOP bit budget among the pictures of the GOP. The required bit budget for each picture frame that will result in a constant quality video output varies with the picture content and the picture coding type. I-type (intra) pictures require more bits than P- and B-type pictures (non-intra pictures, or inter pictures) for a given picture quality. P- and B-type pictures, for the most part, have motion-compensated frame differences that are encoded. Because of the motion-compensated prediction, the number of bits needed to encode non-intra coded pictures depends on how well the previous reference pictures have been encoded. At the picture layer the bit budget for encoding the transform coefficients are preferably set so that the overall video quality is maximized. The overall picture bit budget is shared by the encoding of the motion vectors, the quantized DCT coefficients, and the overhead bits.

Consider, for example, constant-bit-rate scenarios in which a constant number of bits are used within a GOP with a constant quantization parameter within a frame for each frame. Assume a GOP size of G frames, and that the $k^{th}$ frame of the GOP is to be encoded, so that the previous k−1 frames have already been encoded. Also assume a bit budget of $R_{gop}(k)$ for the remaining frames of the GOP with indexes (k, k+1, ..., G). A bit budget $R_i$ for the $i^{th}$ frame can be determined such that the following is achieved:

$$\sum_{i=k}^{G} R_i = R_{gop}(k) \quad \text{Eq. 16}$$

and $$D_i \approx D_j, i \neq j, \quad \text{Eq. 17}$$

where $D_i$ is the distortion of the $i^{th}$ frame. For a H.264 compliant encoder, such as coding system 202, selection of $$Q_I = v^* Q_P = v^* Q_B \text{ with } v = 0.9 \quad \text{Eq. 18}$$

roughly produces equal picture qualities for I, P and B pictures. Using the rate model given in Eq. 11, the target number of bits $R_i$ for the $i^{th}$ frame can be calculated as $$R_i = v_i a_i a_k^{-\alpha_i/\alpha_k} R_k^{\alpha_i/\alpha_k} \left( v_i \begin{cases} 0.9 & \text{if intra} \\ 1 & \text{else} \end{cases} \right), \quad \text{Eq. 19}$$

where $$\sum_{i=k}^{G} v_i a_i a_k^{-\alpha_i/\alpha_k} R_k^{\alpha_i/\alpha_k} = R_{gop}(k) \quad \text{Eq. 20}$$

This requires computation of the parameters $a_i$, $\alpha_i$ of the rate-distortion relation given in Eq. 15 for frames $i=k, ..., G$. This nonlinear equation can be solved iteratively using well-known methods (e.g., Newton's method). Let $$f(R_k) = \sum_{i=k}^{G} v_i a_i a_k^{-\alpha_i/\alpha_k} R_k^{\alpha_i/\alpha_k} - R_{gop(k)} \quad \text{Eq. 21}$$

and let $R_k^m$ be the value of $R_k$ at the $m^{th}$ step. The following pseudo code describes the frame bit allocation algorithm that provides an iteration that can be used to find $R_k$.

$$R_k^0 = \frac{R_{gop}(K)}{G}, m = 1$$

while $|R_k^m - R_k^{m-1}| > \delta$, repeat:

{
$$R_k^m = R_k^{m-1} - \frac{f(R_k)}{f'(R_k)},$$
m++
}
$$R_k = R_k^m$$

The quantization parameter for the frame can be computed using Eq. 11:

$$Q_k = \left[\left[\left(\frac{R_k}{a_k}\right)^{-1/\alpha_k}\right]\right], \quad \text{Eq. 22}$$

where [[.]] denotes rounding to the nearest possible quantization level.

As described above, a single-pass implementation scenario is assumed where there is no prior information about the statistical properties of the video source. Hence, the model parameters (a, α) of the approximate rate model of Eq. 11 are not known and need to be estimated. Consider initialization of the frame bit allocation algorithm by choosing a frame quantization parameter for each frame type in the following manner. Define $B_{pp}$ as the average number of bits targeted per a video frame pixel. It is calculated as $$B_{pp} = R/(F \times N_p) \quad \text{Eq. 23}$$

where R is the target bit-rate, F is the frame rate, and $N_p$ is the number of pixels per frame (e.g., for a 4:2:0 format QCIF sequence, $N_p = 176 \times 144 \times 1.5$). For the given bit-rate R, the initial quantization parameter for the first intra picture, $Q_0^I$, is chosen as $$Q_o^I = \begin{cases} 40 & B_{pp} < 0.05 \\ 30 & 0.05 \leq B_{pp} \leq 0.1 \\ 20 & B_{pp} > 0.1 \end{cases} \quad \text{Eq. 24}$$

Consequently, $Q_o^P = Q_o^B = Q_o^I + 1$. Using the first set of pictures, the model parameters are estimated as follows: after encoding the first intra picture, the DCT statistics are collected, output bits ($R_I$) are calculated, and $\alpha_I$ is set as follows:

$$\alpha_I = \begin{cases} 0.75 & \text{if } \mu < 1.0 \\ 0.85 & \text{if } \mu > 2.0 \\ 0.8 & \text{else} \end{cases} \quad \text{Eq. 25}$$

and $$a_I = \frac{R_I}{(Q_o^I)^{-\alpha_I}} \quad \text{Eq. 28}$$

Also, after encoding first P- and B-pictures, the output bits ($R_P$;$R_B$) are calculated and $\alpha_p$ is set as follows:

$$\alpha_P = \begin{cases} 1.2 & \text{if } R_P/N_P > 0.1 \\ 1.6 & \text{if } R_P/N_P < 0.05, \\ 1.4 & \text{else} \end{cases} \qquad \text{Eq. 27}$$

$$\alpha_B = \begin{cases} 1.6 & \text{if } R_B/N_P > 0.1 \\ 2.0 & \text{if } R_B/N_P < 0.05, \\ 1.8 & \text{else} \end{cases}$$

and $$a_P = \frac{R_P}{(Q_o^I)^{-\alpha_I}}, \quad a_I = \frac{R_B}{(Q_o^B)^{-\alpha_B}} \qquad \text{Eq. 28}$$

For the remaining pictures in the video sequence, the model parameters are updated as follows: (i) α is fixed, and (ii) parameter a for picture type x(x ∈ (I,P,B)) is updated using $$a_x = \delta \times a_x + (1-\delta)\frac{R_x}{(Q)^{-\alpha_x}} \qquad \text{Eq. 29}$$

where δ is a forgetting factor (δ=0.5 in the simulations).

For a given bit-rate target R and a frame rate F, the GOP bit budget ($C_{gop}$) is given as $C_{gop}$=R/F. The bit budget for frame i is calculated as follows:
1) Initialization: Calculate $Q_o^I$, $Q_o^P$ and $Q_o^B$. Initialize the model parameters as described above.
2) Start of a GOP: Set $$R_{gop}(1) = C_{gop}, \qquad \text{Eq. 30}$$

where $C_{gop}$ is the constant target GOP rate.
3) For k=1 to G repeat:
a) Solve for $R_k$ using $$\sum_{i=k}^{G} v_i a_i a_k^{-\alpha_i/\alpha_k} R_k^{\alpha_i/\alpha_k} = R_{gop(k)} \qquad \text{Eq. 31}$$

b) Solve for $Q_k$ using $$Q_k = \left[\left[\left(\frac{R_k}{a_k}\right)^{-1/\alpha i}\right]\right] \qquad \text{Eq. 32}$$

c) Encode frame, and calculate actual output bits, $S_k$.
d) Update $$R_{gop}(k+1) = R_{gop}(k) - S_k \qquad \text{Eq. 33}$$

4) Update the model parameter $$a_k = \delta a_k + (1-\delta)\frac{S_k}{(Q_k)^{-\alpha_k}} \qquad \text{Eq. 34}$$

5) If end of the sequence reached, stop. Else go to step 2.

The frame bit-allocation algorithm was tested in an H.264-compliant video encoder, as well as two conventional methods or algorithms as follows: (i) a rate control algorithm of JM 7.4, and (ii) an improved TM5-based frame bit-allocation algorithm proposed for H.264. Further information on the TM5 method can be found in "*Proceedings of the 2003 International Conference on Image Processing, ICIP '03,*" September 2003, vol. 3, pp. 793-796. Two sets of color video sequences were used. The first set consists of the CIF (352× 288 pixel resolution) sequences: IRENE, PARIS, MOBILE AND CALENDAR, and TEMPETE. The second set consists of the QCIF (176×144 pixel resolution) sequences: AKIYO, CAR PHONE, FOREMAN, IRENE, NEWS, COASTGUARD, SILENT, and MOTHER AND DAUGHTER.

In the tests, an [IPPP . . . ] GOP structure with a GOP size of 12 was used. The first 120 frames of each sequence also were used. The H.264-compliant test encoder implementing the three algorithms was configured to have two reference frames for inter motion search, ¼-pel motion vector resolution, context-based adaptive binary coding (CABAC) for symbol coding, rate-distortion optimized mode decisions, and full search motion estimation with a search range of 16. The target bit-rates are selected as to achieve an output average PSNR close to 35 dB. The PSNR values are measured on the luminance component only.

Table III summarizes the performance results of the three algorithms in terms of output rate, PSNR, and execution time.

| Sequence | Method | Target rate (Kbps) | Output rate (Kbps) | Average Variance (dB) | PSNR variance (dB) | Execution time (sec) |
|---|---|---|---|---|---|---|
| TEMPETE (CIF) | TM5 based | 1500 | 1505.34 | 35.48 | 4.40 | 266 |
| | JM 7.4 | 1500 | 1530.54 | 35.08 | 1.12 | 313 |
| | Coding System | 1500 | 1500.74 | 35.78 | 0.68 | 266 |
| IRENE (CIF) | TM5 based | 300 | 299.99 | 36.44 | 1.91 | 200 |
| | JM 7.4 | 300 | 311.30 | 36.28 | 1.52 | 214 |
| | Coding System | 300 | 299.85 | 36.79 | 0.81 | 200 |
| PARIS (CIF) | TM5 based | 700 | 700.18 | 35.24 | 3.95 | 225 |
| | JM 7.4 | 700 | 699.99 | 35.00 | 0.90 | 278 |
| | Coding System | 700 | 699.99 | 35.67 | 0.66 | 221 |

-continued

| Sequence | Method | Target rate (Kbps) | Output rate (Kbps) | Average Variance (dB) | PSNR variance (dB) | Execution time (sec) |
|---|---|---|---|---|---|---|
| MOBILE & CALEND. (CIF) | TM5 based | 1500 | 1497.43 | 32.42 | 4.28 | 264 |
| | JM 7.4 | 1500 | 1543.43 | 32.09 | 1.20 | 327 |
| | Coding System | 1500 | 1496.56 | 32.56 | 0.43 | 272 |
| FOREMAN (QCIF) | TM5 based | 100 | 100.03 | 33.58 | 3.25 | 51 |
| | JM 7.4 | 100 | 105.23 | 33.70 | 2.67 | 62 |
| | Coding System | 100 | 99.66 | 33.92 | 0.72 | 52 |
| AKIYO (QCIF) | TM5 based | 60 | 59.87 | 37.86 | 2.37 | 48 |
| | JM 7.4 | 60 | 64.18 | 38.14 | 1.47 | 54 |
| | Coding System | 60 | 59.87 | 38.35 | 0.76 | 49 |
| CAR PHONE (QCIF) | TM5 based | 100 | 99.99 | 35.77 | 2.53 | 50 |
| | JM 7.4 | 100 | 105.04 | 36.09 | 1.07 | 59 |
| | Coding System | 100 | 99.91 | 36.08 | 0.66 | 52 |
| NEWS (QCIF) | TM5 based | 100 | 99.91 | 35.59 | 3.79 | 52 |
| | JM 7.4 | 100 | 105.29 | 35.89 | 1.61 | 62 |
| | Coding System | 100 | 99.71 | 35.87 | 0.86 | 54 |
| MOTHER & DAUGHTER (QCIF) | TM5 based | 80 | 80.12 | 35.09 | 3.29 | 51 |
| | JM 7.4 | 80 | 85.96 | 35.18 | 6.08 | 59 |
| | Coding System | 80 | 80.16 | 35.40 | 2.51 | 52 |
| COAST GUARD (QCIF) | TM5 based | 100 | 99.91 | 30.23 | 2.22 | 53 |
| | JM 7.4 | 100 | 107.84 | 30.16 | 2.48 | 62 |
| | Coding System | 100 | 99.89 | 30.48 | 1.08 | 54 |
| SILENT (QCIF) | TM5 based | 80 | 80.07 | 33.40 | 1.27 | 49 |
| | JM 7.4 | 80 | 87.36 | 33.63 | 6.93 | 57 |
| | Coding System | 80 | 80.01 | 34.12 | 1.73 | 51 |
| IRENE (QCIF) | TM5 based | 100 | 99.98 | 34.67 | 2.55 | 50 |
| | JM 7.4 | 100 | 106.32 | 35.01 | 2.21 | 55 |
| | Coding System | 100 | 100.03 | 35.10 | 1.00 | 49 |

Output rates produced by both the TM5-based algorithm and coding system frame bit allocation algorithm meet the target bit-rate successfully. Average PSNR values, and the PSNR variation between frames are also shown in Table III. The coding system frame bit-allocation algorithm achieves an average of 0.33 dB PSNR gain over the TM5-based frame bit allocation and an average of 0.53 dB PSNR gain over JM 7.4 rate control. In addition, the coding system algorithm achieves considerably reduced PSNR variation between frames. Table III also shows the execution times for the three algorithms. The coding system algorithm complexity is only marginally worse than the TM5-based algorithm. Therefore, the coding system frame bit allocation algorithm can achieve significant quality improvement over the TM5 based algorithm and JM 7.4 rate control without any significant complexity increase or rate output performance degradation. Thus, the resulting improvement with the coding system frame bit allocation algorithm is due at least in part to the more accurate modeling and improved model parameter handling used for frame bit allocation.

Note that the coding system frame bit allocation method can be extended to a complete rate control algorithm by incorporating a macroblock layer quantization adaptation method.

It should be emphasized that the above-described embodiments are merely possible examples of implementations, merely set forth for a clear understanding of the disclosed principles. Many variations and modifications may be made to the above-described embodiment(s) without departing substantially from the disclosed spirit and principles. All such modifications and variations are intended to be included herein within the scope of this disclosure and protected by the following claims.

What is claimed:

1. A method of rate and distortion optimization for image and video processing, comprising:
    determining a Cauchy-based probability density function fit to a statistical distribution of coefficients generated from a transformed image frame block that are to be quantized;

estimating rate and distortion of quantized coefficients based on the Cauchy-based probability density function; and using the rate-distortion equation $D=cR^{-\gamma}$ to model rate and distortion.

2. The method of claim 1, wherein the estimating is based on a coding parameter.

3. The method of claim 2, wherein the coding parameter includes at least one of an encoding parameter, a quantization parameter, and a quantization scale.

4. The method of claim 1, wherein the estimating includes modeling.

5. The method of claim 4, wherein the modeling includes modeling the distortion as a function of the rate.

6. The method of claim 4, wherein the modeling includes modeling the distortion and the rate as a function of a quantization parameter.

7. The method of claim 1, wherein the estimating includes estimating the optimal rate and distortion of quantized coefficients to produce an optimized rate-distortion.

8. The method of claim 7, wherein the rate-distortion optimization is applied for at least one of rate control, motion estimation, motion compensation, and macroblock coding mode selection of an encoder.

9. The method of claim 7, wherein the rate-distortion optimization is applied for functions of an encoder.

10. The method of claim 7, wherein the optimized rate-distortion is applied for rate control for an encoder.

11. The method of claim 7, wherein the optimized rate-distortion is applied for rate and distortion control for still image compression.

12. The method of claim 11, wherein the still image compression includes JPEG.

13. The method of claim 1, wherein the determining includes determining a Cauchy-based probability density function of discrete cosine transform coefficients.

14. The method of claim 1, further including applying rho-domain models in conjunction with the Cauchy-based probability density function.

15. A coding system, comprising:
transform logic configured to transform an image frame block to coefficients that are to be quantized; and
coding control logic configured to determine a Cauchy-based probability density function fit to a statistical distribution of the coefficients, said coding control logic configured to estimate rate and distortion of quantized coefficients based on the Cauchy-based probability density function, and further configured to use the rate-distortion equation $D=cR^{-\gamma}$ to model rate and distortion.

16. The coding system of claim 15, wherein the coding control logic is configured to estimate based on a coding parameter.

17. The coding system of claim 15, wherein the coding control logic is configured to estimate the distortion due to quantization as a function of the rate.

18. The coding system of claim 15, wherein the coding control logic is configured to estimate the distortion and the rate as a function of a quantization parameter.

19. The coding system of claim 15, wherein the coding control logic is configured with an optimized rate-distortion algorithm based on the estimates.

20. The coding system of claim 15, wherein the coding control logic is configured to apply the optimized rate-distortion algorithm to at least one of rate control, motion estimation, motion compensation, and macroblock coding mode selection.

21. The coding system of claim 15, wherein the coding control logic is configured to apply the optimized rate-distortion algorithm to coding functions.

22. The coding system of claim 15, wherein the coding control logic is configured to apply the optimized rate-distortion algorithm to rate control.

23. The coding system of claim 15, wherein the coding control logic is configured to apply the optimized rate-distortion algorithm to rate and distortion control for still image compression.

24. The coding system of claim 15, wherein the coding control logic includes a rate control module.

25. The coding system of claim 15, further including at least one of a mode selection module, a transform module, a quantization module, a function module, an inverse quantization module, an inverse transform module, a predictor module, a motion estimation module, a frame store module, and an entropy coding module configured in software.

26. The coding system of claim 15, further including at least one of a mode selection module, a quantization module, a function module, an inverse quantization module, an inverse transform module, a predictor module, a motion estimation module, a frame store module, and an entropy coding module configured in hardware.

27. The coding system of claim 15, further including at least one of a mode selection module, a quantization module, a function module, an inverse quantization module, an inverse transform module, a predictor module, a motion estimation module, a frame store module, and an entropy coding module configured in software and hardware.

28. The coding system of claim 15, further including at least one of a mode selection module, a quantization module, a function module, an inverse quantization module, an inverse transform module, a predictor module, a motion estimation module, a frame store module, and an entropy coding module configured in a computer readable medium.

29. The coding system of claim 15, wherein the coding control logic is configured in at least one of software and hardware.

30. The coding system of claim 15, wherein the transform logic is configured in at least one of software, hardware, and a computer readable medium.

31. A coding system, comprising:
means for determining a Cauchy-based probability density function fit to a statistical distribution of coefficients generated from a transformed image frame block that are to be quantized;
means for estimating rate and distortion of quantized coefficients based on the Cauchy-based probability density functions; and
means for using the rate-distortion equation $D=cR^{-\gamma}$ to model rate and distortion.

* * * * *